Sept. 20, 1932.　　　L. R. CROUCH　　　1,878,829
BRAZED OR WELDED JOINT
Original Filed Dec. 10, 1928
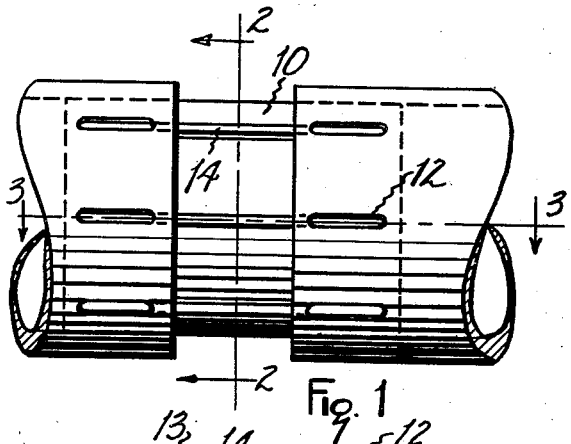
Fig. 1
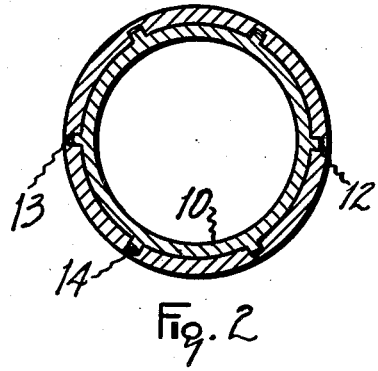
Fig. 2
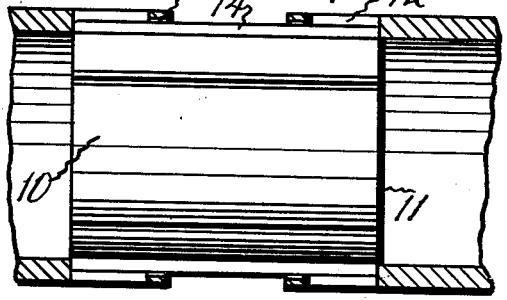
Fig. 3
Fig. 4
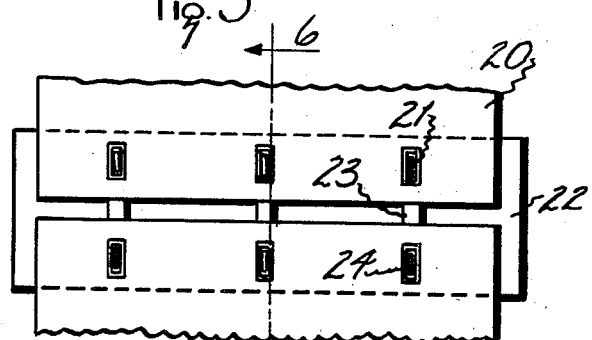
Fig. 5 / Fig. 6
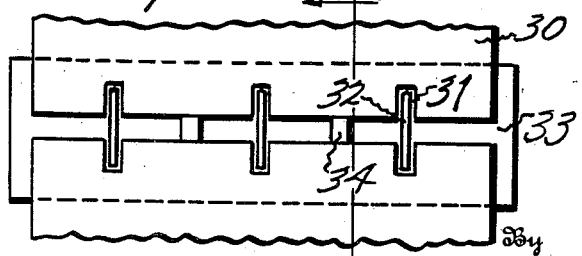
Fig. 7
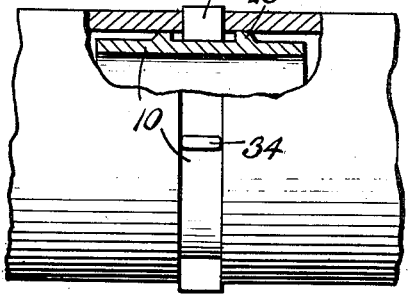
Fig. 8. / Fig. 9.
Inventor
L. R. Crouch
By Jack D. Ashley
Attorney Patented Sept. 20, 1932

1,878,829

UNITED STATES PATENT OFFICE

LOGAN R. CROUCH, OF MEMPHIS, TENNESSEE

BRAZED OR WELDED JOINT

Application filed December 10, 1928, Serial No. 325,102. Renewed September 14, 1931.

This invention relates to new and useful improvements in brazed or welded joints.

One object of the invention is to provide means whereby a reinforced brazed or welded joint will be provided, thus giving greatly increased strength and preventing fracturing of the weld.

A further object of the invention is to provide means for more quickly heating the metal elements which are to be brazed or welded, thus making for speed and economy.

A construction designed to carry out the invention will be hereinafter described, together with other features of the invention.

The invention will be more readily understood from a reading of the following specification and by reference to the accompanying drawing, in which an example of the invention is shown, and wherein:

Fig. 1 is a partial elevation of a pipe joint constructed in accordance with the invention and ready to be welded or brazed, Fig. 2 is a transverse sectional view taken on the line 2—2 of Fig. 1, Fig. 3 is a longitudinal sectional view taken on the line 3—3 of Fig. 1, Fig. 4 is an elevation of a pipe showing a completed joint, Fig. 5 is a plan view showing a joint for plates, Fig. 6 is an enlarged transverse sectional view taken on the line 6—6 of Fig. 5, Fig. 7 is a plan view of another form of plate joint, Fig. 8 is an enlarged transverse sectional view taken on the line 8—8 of Fig. 7, and Fig. 9 is a side elevation partially in section, of a pipe joint employing an inner sleeve corresponding to the bar of Fig. 8, and similarly spaced away from the pipes at their ends.

In the drawing the numeral 10 designates a sleeve which telescopes into the counterbores or sockets 11 formed in the ends of the pipes. In the walls of the counterbores or reduced ends of the pipe a plurality of slots 12 are cut. The slots are disposed longitudinally of the pipe and are spaced circumferentially thereof. Each slot has one end connected with the end of the pipe by a short internal groove 13.

The sleeve is formed with longitudinally extending ribs 14 which telescope through the grooves 13 and underlie the slots 12. The size and shape of these ribs is immaterial and the ribs may be continuous or otherwise.

When the welding torch is applied and the welding metal added the ribs will be welded to the pipes, particularly at the slots, so that a reinforced joint, as is shown in Fig. 4, will be produced. Usually the weld is confined to the space between the pipe ends and upon sagging of the joint will break. By welding the ribs in the slots and grooves the joint is so reinforced that it will not break or leak upon sagging or distortion.

In Figs. 5 and 6 I have shown a seam weld for plates. The plates 20 are formed with spaced longitudinal slots 21 set inwardly from their adjacent edges. A bar 22 bridges the gap between the plates and has spacing lugs 23 projecting into the gap.

Reinforcing lugs 24 on the bar extend through the slots; while bosses 25 on the bar support the plates out of contact with the bar. When the torch is applied to the lugs to weld the parts it is not necessary to heat the bar and the bosses supporting the plates above the bar cause the plates and lugs to be heated much quicker. These bosses could be used on the sleeve 10. The lugs reinforce the seam.

In Figs. 7 and 8 the plates 30 have recesses 31 extending inwardly from their edges for receiving the ends of ribs 32 formed on a bar 33. Spacing lugs 34 are provided. Otherwise it is substantially the same as Figs. 5 and 6. It is to be noted that the lugs 23 and 34 project beyond the outer surfaces of the plates 20 and 30 respectively. These lugs may be upset so as to overhang the edges of said plates and thereby prevent curling or buckling from the heat of the torch. This is of particular advantage where the sheets are quite thin.

In Fig. 9, the sleeve 10 which telescopes within the pipe ends, has an outer diameter somewhat less than the inner diameter of the pipes, the sleeve being centered and held away from the pipes by the bosses 25. The lugs 34 center the sleeves longitudinally and space the ends of the pipe apart.

The invention is not to be limited to the weldable projections and the important feature resides in the slots or recesses, whereby welding is carried out within the margin of the end of the pipe. The joints may be formed either by welding or by brazing. When the joint is required to withstand high temperatures welding is preferable, however, brazing is preferable for cast and malleable iron pipe. As a general rule brazing is used for light-weight joints, while welding is used for heavy joints. The invention is not limited to either welding or brazing.

Various changes in the size and shape of the different parts, as well as modifications and alterations, may be made within the scope of the appended claims.

What I claim, is:

1. A joint of the character described comprising members to be secured together, a connecting element telescoping said members, said members being spaced apart a substantial distance so as to provide a space for a filler, said members being provided with spaced openings near their adjacent edges, projections on the connecting element registering with the openings of said members, and a molten metal bond filled into the space between the members and fused with the projections in the openings of the members.

2. A joint as set forth in claim 1, and spacing projections on the connecting element between the ends of the members for holding them apart, but occupying only a portion of the filler space.

3. A joint of the character described, comprising members to be secured together, said members being spaced apart so as to provide a space for a filler, a connecting element underlying said joint and the adjacent member ends and spaced therefrom, means projecting from said element into said filler space to limit approach of said members one toward the other, said means occupying a portion only of the filler space, and a molten metal bond filled into the space between the members, and fused therewith.

4. A joint of the character described, comprising hollow cylinders to be secured together, said cylinders having their ends spaced apart a substantial distance to provide a filler gap, a cylindrical sleeve of greater length than said gap and of less exterior diameter than the interior diameter of said cylinders, disposed within said cylinder ends and bridging said gap, said sleeve having projecting means conforming in diameter to the interior diameter of said cylinders and spaced longitudinally a distance apart greater than said gap, said means centering the interiors of said cylinders relatively to and spacing them from the body of said sleeve; and a molten metal bond filled into said gap and between said ends and said sleeve, said bond being fused with said ends and said sleeve.

5. A joint of the character described, comprising hollow cylinders to be secured together, said cylinders having their ends spaced apart to provide a filler gap, a cylindrical sleeve of greater length than said gap and of less exterior diameter than the interior diameter of said cylinders, disposed within said cylinder ends and bridging said gap, said sleeve having projecting means, the remote sides of which are spaced longitudinally apart a distance greater than said gap, said remote sides sloping outward from said sleeve and toward each other, said projecting means centering the interiors of said cylinders relatively to and spacing them from the body of said sleeve, and a molten metal bond filled into said gap, and into the space between said ends and said sleeve, said bond being fused with said ends and said sleeve.

6. A joint of the character described, comprising hollow cylinders to be secured together, said cylinders having their ends spaced apart a substantial distance to provide a filler gap, a cylindrical sleeve of greater length than said gap and of less exterior diameter than the interior diameter of said cylinders said sleeve having projecting means conforming in diameter to the interior diameter of said cylinders and spaced longitudinally a distance apart greater than said gap for centering the interiors of said cylinders relatively to said sleeve and said sleeve having means projecting therefrom into said gap to longitudinally center said sleeve and limit approach of said ends, said latter means occupying a portion only of the filler gap, and a molten metal bond filled into said gap, and into the space between said ends and said sleeve, said bond being fused with said ends and said sleeve.

7. A joint of the character described, comprising hollow cylinders to be secured together, said cylinders having their ends spaced apart to provide a filler gap, a sleeve disposed within said cylinder ends and bridging said gap, the major portion of said sleeve being spaced radially away from the walls of said cylinder, said sleeve having means extending therefrom into said gap to longitudinally position said sleeve and limit approach of said ends, said means, occupying a portion only of the filler space, and a molten metal bond filled into the space between the cylinder ends, and fused therewith.

8. A joint of the character described, comprising hollow cylinders to be secured together, said cylinders having their ends spaced apart to provide a filler gap, an annular sleeve disposed within said cylinder ends and bridging said gap, said sleeve having less external diameter than the interior diameter of said cylinders, bosses radially centering said sleeve relatively to said cylinders, said sleeve having lugs extending into said gap to longitudinally center said sleeve and limit approach of said ends, said lugs occupying a portion only of the filler space, and a molten metal bond filled into the space between the cylinder ends, and fused with said ends and said lugs.

9. A joint of the character described, comprising hollow cylinders to be secured together, said cylinders having their ends spaced apart to provide a filler gap, a sleeve disposed within said cylinder ends and bridging said gap, the exterior of the body of said sleeve being spaced radially away from the interior of said cylinders, said sleeve having portions contacting with the interior of said cylinders to radially position said sleeve, relatively thereto; said sleeve having a projection extending into said gap to center said element and limit approach of said ends, said projection occupying a portion only of the filler space, and a molten metal bond filled into the space between the cylinder ends, and fused therewith.

In testimony whereof I affix my signature.

LOGAN R. CROUCH.